(12) United States Patent
Han

(10) Patent No.: US 8,724,660 B2
(45) Date of Patent: May 13, 2014

(54) TRANSMISSION AND RECEPTION APPARATUS FOR DYNAMIC LANE OPERATION IN MULTI-LANE BASED ETHERNET SYSTEM, AND METHOD OF CONTROLLING THE SAME

(75) Inventor: Kyeongeun Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 263 days.

(21) Appl. No.: 12/947,571

(22) Filed: Nov. 16, 2010

(65) Prior Publication Data

US 2011/0149772 A1    Jun. 23, 2011

(30) Foreign Application Priority Data

Dec. 17, 2009   (KR) .................. 10-2009-0125882
Feb. 1, 2010    (KR) .................. 10-2010-0009109

(51) Int. Cl.
*G06F 11/00*    (2006.01)

(52) U.S. Cl.
USPC .......................................... 370/503; 714/707

(58) Field of Classification Search
USPC ............ 370/229, 257, 356, 395.72, 412, 428, 370/503, 506, 509; 714/56, 706, 707, 708, 714/715, 821; 710/106, 107, 129, 305, 310, 710/316

See application file for complete search history.

(56) References Cited

U.S. PATENT DOCUMENTS

| | | | |
|---|---|---|---|
| 6,745,353 B2 * | 6/2004 | Susnow et al. | 714/706 |
| 6,747,997 B1 * | 6/2004 | Susnow et al. | 370/509 |
| 6,757,348 B1 * | 6/2004 | Vila et al. | 375/372 |
| 7,209,478 B2 | 4/2007 | Rojas et al. | |
| 7,525,983 B2 * | 4/2009 | Dropps et al. | 370/437 |
| 8,385,374 B1 * | 2/2013 | Wohlgemuth | 370/509 |
| 2002/0159385 A1 * | 10/2002 | Susnow et al. | 370/229 |
| 2005/0063310 A1 * | 3/2005 | Caldwell et al. | 370/241 |
| 2005/0262284 A1 * | 11/2005 | Cherukuri et al. | 710/307 |
| 2007/0103338 A1 * | 5/2007 | Teo | 340/933 |
| 2007/0150762 A1 | 6/2007 | Sharma et al. | |
| 2007/0263533 A1 * | 11/2007 | Chiabrera | 370/229 |
| 2010/0092174 A1 * | 4/2010 | Brown et al. | 398/79 |
| 2010/0229071 A1 * | 9/2010 | Ganga et al. | 714/776 |

* cited by examiner

*Primary Examiner* — Michael Thier
*Assistant Examiner* — Prince A Mensah
(74) *Attorney, Agent, or Firm* — Rabin & Berdo, P.C.

(57) ABSTRACT

Provided is a transmission apparatus for a dynamic lane operation in a multi-lane based Ethernet system, including: a monitor to monitor whether at least one lane being used by the transmission apparatus is modified; an upper layer manager to transmit, to a Reconciliation Sublayer (RS) of the transmission apparatus, lane change information associated with the modified at least one lane; and an RS manager to transmit the lane change information to an RS of a reception apparatus corresponding to the RS of the transmission apparatus.

13 Claims, 10 Drawing Sheets

FIG. 6

| Lane 0 | Lane 1 | Lane 2 | Lane 3 | Lane 4 | Lane 5 | Lane 6 | Lane 7 |
|--------|--------|--------|--------|--------|--------|--------|--------|
| Sequence | >=0x00 | >=0x00 | >=0x03 | 0x00 | 0x00 | 0x00 | 0x00 |

610

TRANSMISSION AND RECEPTION APPARATUS FOR DYNAMIC LANE OPERATION IN MULTI-LANE BASED ETHERNET SYSTEM, AND METHOD OF CONTROLLING THE SAME

CROSS-REFERENCE TO RELATED APPLICATIONS

This application claims the benefit of Korean Patent Application No. 10-2009-0125882, filed on Dec. 17, 2009, in the Korean Intellectual Property Office, and Korean Patent Application No. 10-2010-0009109, filed on Feb. 1, 2010, in the Korean Intellectual Property Office, the disclosures of which are incorporated herein by reference.

BACKGROUND

1. Field of the Invention

The present invention relates to a transmission and reception apparatus and method of controlling the same, and more particularly, to a transmission and reception apparatus for a dynamic lane operation in a multi-lane based Ethernet system and a method of controlling the same.

2. Description of the Related Art

An Institute of Electrical and Electronics Engineers (IEEE) 802.3ba standard is a high speed wideband transmission scheme for supporting 40 Gb/s and 100 Gb/s Ethernet communication, and is in the final stage of standardization by the IEEE 802.3ba Task Force. As a scheme for a high speed Ethernet system having a transmission rate of at least 10 Gb/s, IEEE 802.3ba utilizes a multi-lane structure where a single high speed transmission link is configured based on a plurality of lanes having a relatively low transmission rate.

For a 100 Gb/s Ethernet apparatus and a 40 Gb/s Ethernet apparatus, IEEE 802.3ba defines each of ten electrical lanes and four electrical lanes between a Physical Coding Sublayer (PCS) and a Physical Media Attachment (PMA) layer. Here, each electrical lane transfers data in correspondence to a plurality of optical lanes via the PMA layer.

In addition, IEEE 802.3ba defines each of 20 virtual lanes and four virtual lanes within the PCS so as to support a mutual combination between the electrical lanes and the optical lanes. With respect to the virtual lanes, IEEE 802.3ba additionally defines a PCS lane distribution block distributing or combining 64 B/66 B coded blocks.

A high speed Ethernet system transmitting a large amount of data may dynamically use available bandwidth for a predefined purpose, for example, performing error management, decreasing power consumption, managing an array element, and the like, or may dynamically use bandwidth depending on circumstances of a network. For the above purpose, a dynamic to lane operation using an Ethernet structure having both a large capacity and a plurality of lanes is enabled.

However, when dynamically using lanes in a large capacity multi-lane based Ethernet system, a number of lanes changed between a transmission side and a reception side and related information needs to be known for smooth communications. Accordingly, there is a desire for an effective processing method procedure.

SUMMARY

An aspect of the present invention provides a method of dynamically operating a number of lanes in a high speed Ethernet system or apparatus based on multiple lanes.

Another aspect of the present invention also provides a method of processing and transferring information associated with a lane modified when dynamically operating lanes, and a corresponding information frame format.

According to an aspect of the present invention, there is provided a transmission apparatus for a dynamic lane operation in a multi-lane based Ethernet system, including: a monitor to monitor whether at least one lane being used by the transmission apparatus is modified; an upper layer manager to transmit, to a Reconciliation Sublayer (RS) of the transmission apparatus, lane change information associated with the modified at least one lane; and an RS manager to transmit the lane change information to an RS of a reception apparatus corresponding to the RS of the transmission apparatus.

According to another aspect of the present invention, there is provided a reception apparatus for a dynamic lane operation in a multi-lane based Ethernet system, including: an RS manager to receive, from a transmission apparatus, lane change information that is associated with a modification in at least one lane being used by the transmission apparatus; and a Physical Coding Sublayer (PCS) manager to change a number of at least one lane being used by the reception apparatus based on the lane change information.

According to still another aspect of the present invention, there is provided a method of controlling a transmission apparatus for a dynamic lane operation in a multi-lane based Ethernet system, the method including: monitoring whether at least one lane being used by the transmission apparatus is modified; transmitting, to an RS of the transmission apparatus, lane change information associated with the modified at least one lane; and transmitting the lane change information to an RS of a reception apparatus corresponding to the RS of the transmission apparatus.

According to yet another aspect of the present invention, there is provided a method of controlling a reception apparatus for a dynamic lane operation in a multi-lane based Ethernet system, the method including: receiving, from a transmission apparatus, lane change information that is associated with a modification in at least one lane being used by the transmission apparatus; and changing a number of at least one lane being used by the reception apparatus based on the lane change information.

Effect

According to embodiments of the present invention, by using information associated with a number of lanes dynamically changed when dynamically operating lanes, it is possible to readily and effectively process transmission and reception in a multi-lane based high speed Ethernet system or apparatus, and to simultaneously transfer changed lane information.

Also, according to embodiments of the present invention, it is possible to provide a compatible and effective frame format using characteristics of multi-lane based high speed Ethernet shown in an existing frame and standardization.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 6 is a diagram illustrating a frame format for transferring lane change information according to an embodiment of the present invention;

DETAILED DESCRIPTION

Figure 1:
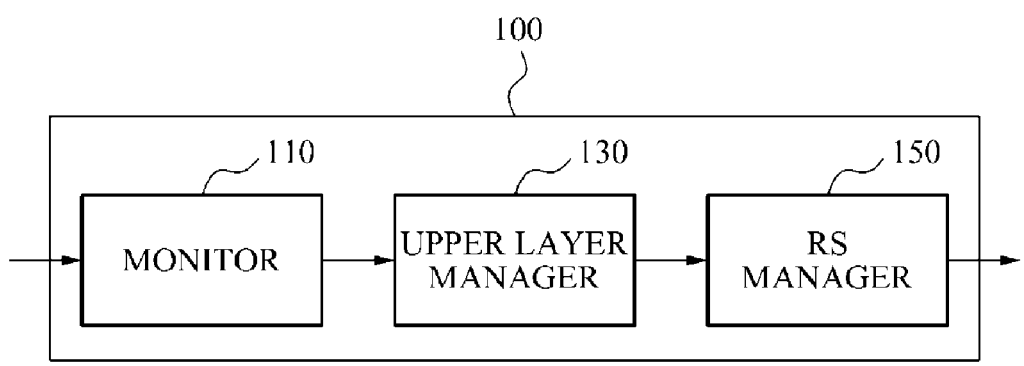
FIG. 1 is a block diagram of a transmission apparatus for a dynamic lane operation in a multi-lane based Ethernet system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram of a transmission apparatus 100 for a dynamic lane operation in a multi-lane based Ethernet system according to an embodiment of the present invention.

Referring to FIG. 1, the dynamic apparatus 100 may include a monitor 110, an upper layer manager 130, and a Reconciliation Sublayer (RS) manager 150.

The monitor 110 may monitor whether at least one lane being used by the transmission apparatus 100 is modified.

The upper layer manager 130 may transmit, to an RS of the transmission apparatus 100, lane change information associated with the modified at least one lane.

Here, the lane change information may include a number of the modified at least one lane.

The lane change information may be transmitted using a sequence ordered-set frame format, which will be described later with reference to FIG. 6 through FIG. 8.

The RS manager 150 may transmit the lane change information to an RS of a reception apparatus corresponding to the RS of the transmission apparatus 100.

Figure 2:
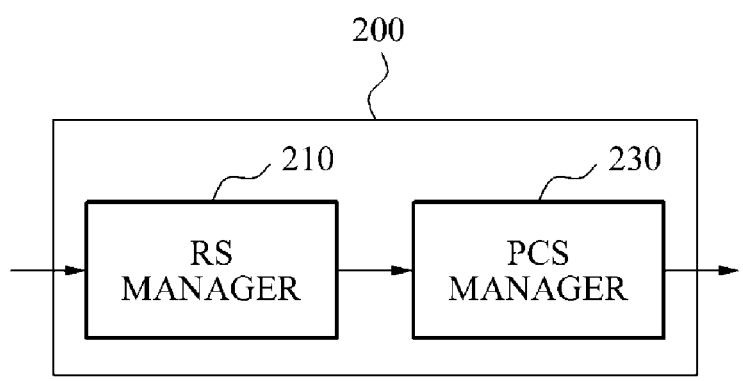
FIG. 2 is a block diagram of a reception apparatus for a dynamic lane operation in a multi-lane based Ethernet system according to an embodiment of the present invention.

FIG. 2 is a block diagram of a reception apparatus 200 for a dynamic lane operation in a multi-lane based Ethernet system according to an embodiment of the present invention.

Referring to FIG. 2, the reception apparatus 200 may include an RS manager 210 and a PCS manager 230.

The RS manager 210 may receive, from a transmission apparatus 100, lane change information.

Here, the lane change information may be associated with a modification in at least one lane being used by the transmission apparatus, and may include a number of modified at least one lane.

The lane change information may be transmitted and be received between the RS manager 210 and the PCS manager 230 using a sequence ordered-set frame format. The sequence ordered-set frame format will be described later with reference to FIG. 6 through FIG. 8.

The PCS manager 230 may receive changed lane information using a variety of schemes.

The PCS manager 230 may receive information from the RS manager 210 using an internal signal, or the RS manager 210 may gather corresponding information when the sequence ordered-set frame format is received from a lower layer.

The PCS manager 230 may change a number of at least one lane being used by the reception apparatus 200 based on the lane change information.

The PCS manager 230 may receive a number of alignment markers and a number of synchronization bits corresponding to the changed number of at least one lane with respect to each of the at least one lane being used by the reception apparatus 200, and may subsequently allocate the at least one lane being used by the reception apparatus 200 based on the changed number of at least one lane.

Figure 3:
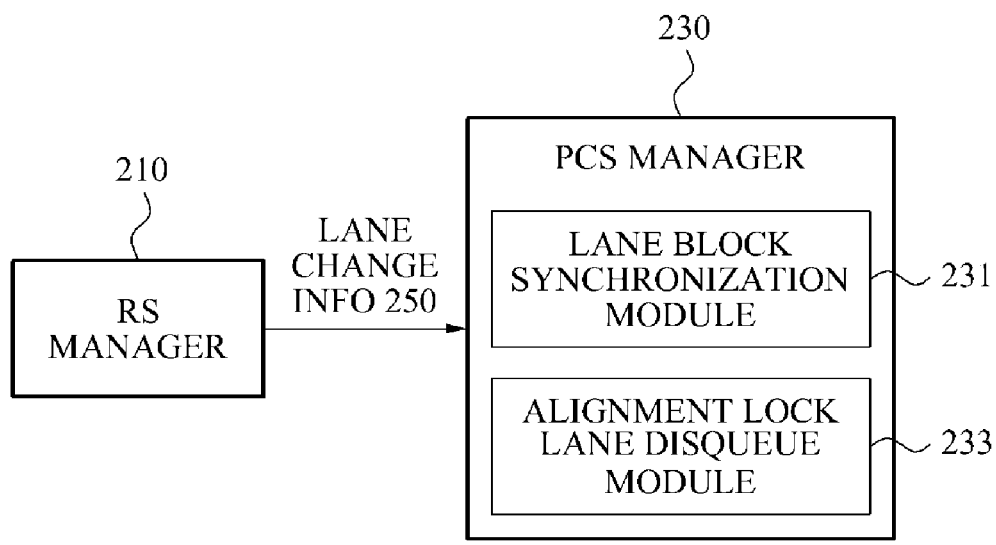
FIG. 3 is a block diagram illustrating a configuration of a Physical Coding Sublayer (PCS) manager of FIG. 2.

The PCS manager 230 may be configured as shown in FIG. 3.

FIG. 3 is a block diagram illustrating a configuration of the PCS manager 230 of FIG. 2.

Referring to FIG. 3, the PCS manager 230 receiving lane change information 250 from the RS manager 210 may reflect the lane change information 250 through a lane block synchronization module 231 and an alignment lock lane disqueue module 233.

Each function of the PCS manager 230 is performed based on lanes and thus is to performed and is completed after a number of alignment markers, a number of synchronization bits, and the like corresponding to a number of the lanes are received. Accordingly, when dynamically determining the number of lanes and using the determined number of lanes, all the lanes or a portion of the lanes may be used. In this case, it may be determined that the number of alignment markers, the number of synchronization bits, and the like corresponding to the number of lanes are not received and thereby an error may occur.

Accordingly, reception and other processing of the PCS manager 230 may need to be performed based on the lane change information 250 received from the RS manager 210.

The lane block synchronization block 231 may receive, from a lower layer, a control signal and a synchronization signal for each of at least one lane being used by the reception apparatus 200. For example, the lower layer may include a physical layer such as a Physical Media Attachment (PMA) sublayer, a Physical Media Dependent (PMD) sublayer, and the like.

The alignment lock lane disqueue module 233 may adjust an alignment state and a torsion of each of the at least one lane being used by the reception apparatus 200, using the control signal received by the lane block synchronization block 231.

The lane block synchronization module 231 or the alignment lock lane disqueue module 233 may determine whether a number of synchronization bits and a number of alignment markers received with respect to the at least one lane being used by the reception apparatus match a number of lanes being currently used. When they match each other, the lane block synchronization module 231 or the alignment lock lane disqueue module 233 may determine a corresponding processing as normal and thereby perform.

Figure 4:
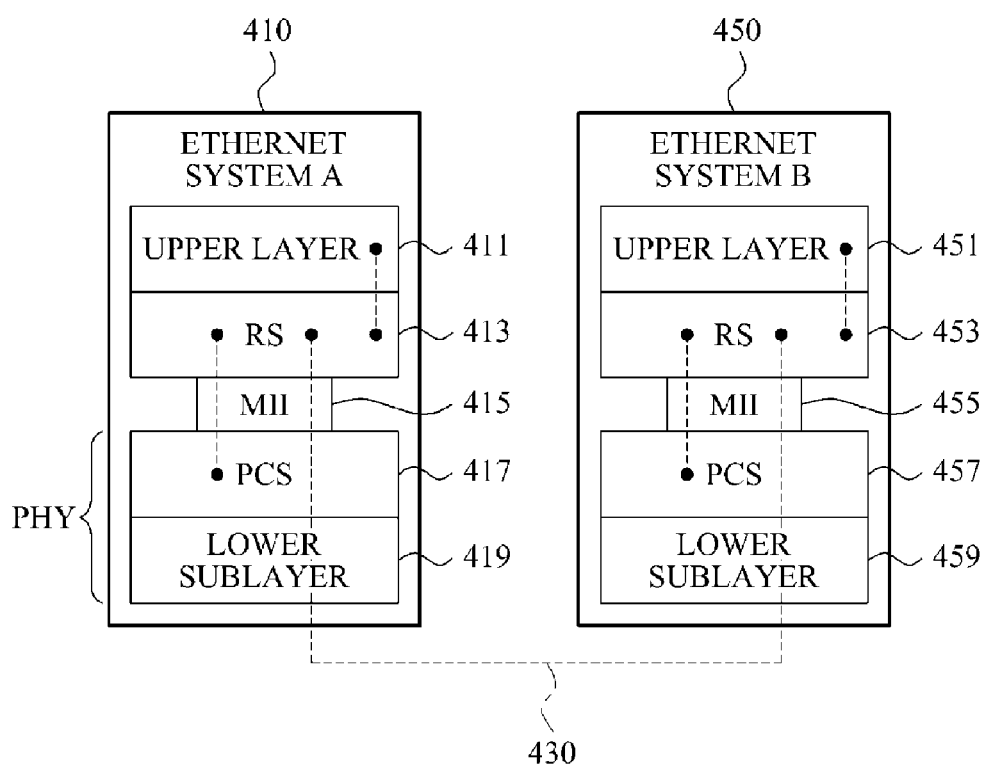
FIG. 4 is a diagram illustrating 40 Gb/s and 100 Gb/s Ethernet layer structure based on multiple lanes according to an embodiment of the present invention.

FIG. 4 is a diagram illustrating 40 Gb/s and 100 Gb/s Ethernet layer structure based on multiple lanes according to an embodiment of the present invention.

Hereinafter, a procedure of adjusting a number of lanes for a dynamic lane operation in a multi-lane based Ethernet system and an operation between layers will be described.

In FIG. 4, 40 Gb/s multi-lane based Ethernet system corresponds to an Ethernet system A 410, and 100 Gb/s multi-lane based Ethernet system corresponds to an Ethernet system B 450. The Ethernet system A 410 may include an upper layer 411, an RS 413, a PCS 417, and a lower sublayer 419. The Ethernet system B 450 may include an upper layer 451, an RS 453, a PCS 457, and a lower sublayer 457. The RS 413 may be connected with the PCS 417 via a Media Independent Interface (MII) 415, and the RS 453 may be connected with the PCS 457 via an MII 455.

Here, the upper layer 411 denotes upper layers of the RS 413 including a Media Access Control (MAC) layer. The lower sublayer 419 denotes a PMA sublayer, a PMD sublayer, and the like that are sublayers of the PCS 417 within a physical layer (PHY).

When desiring to dynamically convert and thereby use a portion of the entire transmission band in the multi-lane based high speed Ethernet system, a dynamic operation may be enabled using each lane of a link.

For example, in the case of 40 Gb/s Ethernet system, it is possible to variably use a maximum number of four lanes. In the case of 100 Gb/s Ethernet system, it is possible to variably use a maximum number of ten lanes. In this instance, when corresponding frames are received from all the lanes, for example, four lanes in the 40 Gb/s Ethernet system and ten lanes in the 100 Gb/s Ethernet system, a transceiver of a multi-lane based system may normally perform a synchronization and alignment function based on a number of synchronization bits and a number of alignment markers received for each lane.

Accordingly, when dynamically using lanes depending on circumstances of a network, there is a need to adjust a number of lanes being currently used between the Ethernet system A 410 and the Ethernet system B 450 that are communicating with each other.

In the Ethernet system A 410, lane change information containing change information regarding a number of lanes determined according to a policy of the upper layer 411 may be transferred to the RS 413.

As indicated by a dotted line 430, the RS 413 may transmit, to the RS 453 of the communicating Ethernet system B 450, lane change information containing the changed number of lanes.

The RS 453 may be connected with the PCS 457 via the Mil 455.

The lane change information may be transferred from the RS 453 to the PCS 457 for a transmission and reception process.

Figure 5:
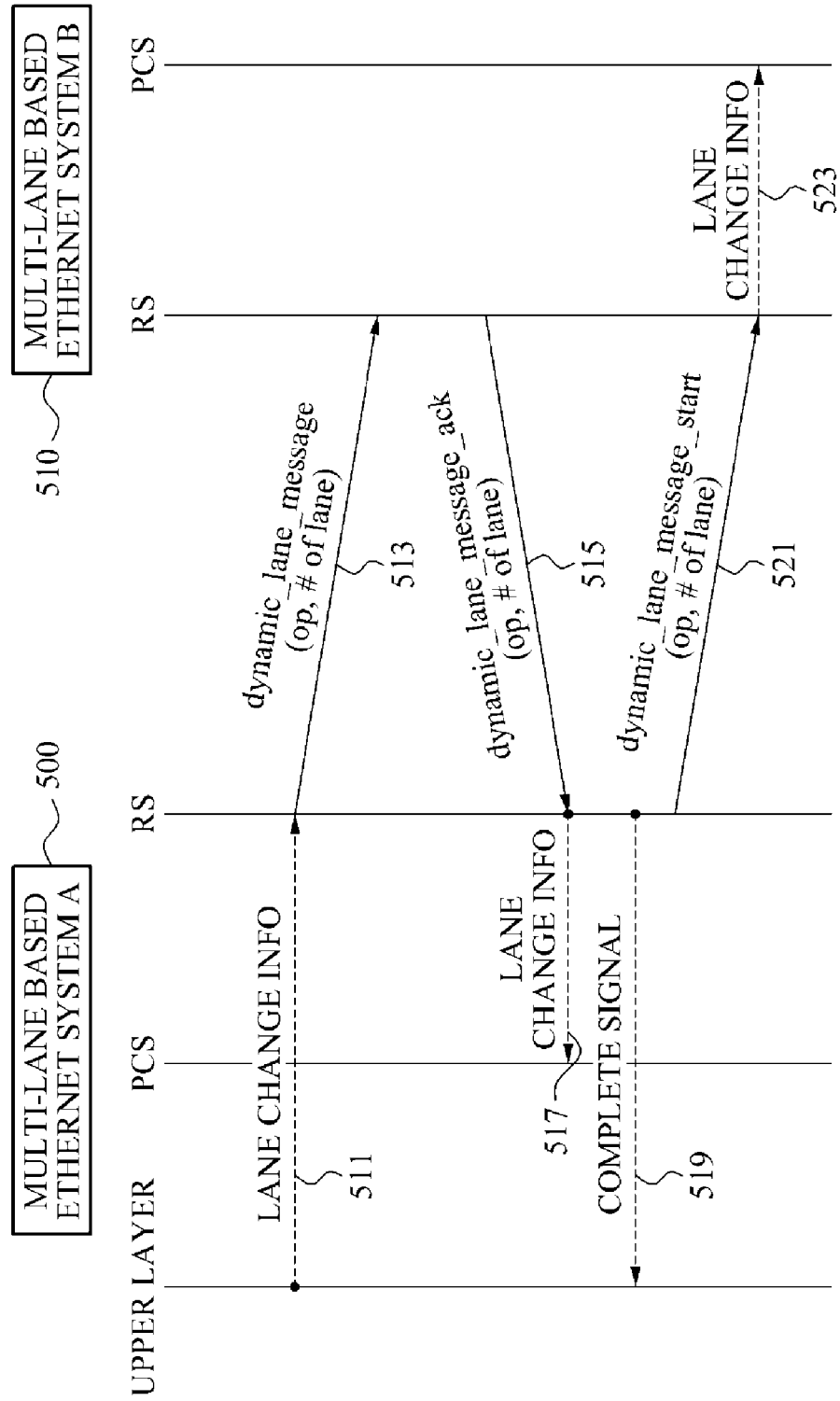
FIG. 5 is a diagram illustrating a flow of a control signal when dynamically operating lanes in a multi-lane based Ethernet system according to an embodiment of the present invention.

FIG. 5 is a diagram illustrating a flow of a control signal when dynamically operating lanes in a multi-lane based Ethernet system according to an embodiment of the present invention.

Specifically, FIG. 5 shows a flow of a control signal among an upper layer, an RS, and a PCS when dynamically operating lanes in a multi-lane based Ethernet system.

When a number of lanes being currently used are changed according to a policy of the upper layer of a multi-lane based Ethernet system A 500, an upper layer manager may internally transfer lane change information to an RS manager in operation 511.

In this instance, a change in the number of lanes and whether information associated with the lanes is modified may be monitored by a monitor.

In operation 513, the RS manager may transmit the lane change information to an RS of a multi-lane based Ethernet system B 510 using dynamic_lane_message. In operation 515, in response to the received lane change information, an RS manager of the multi-lane based Ethernet system B 510 may transmit dynamic_lane_message_ack.

The RS manager of the multi-lane based Ethernet system A 500 may transmit the adjusted lane change information to the PCS manager in operation 517, and may inform the upper layer about a completion of the lane adjustment in operation 519.

In operation 521, the RS manager of the multi-lane based Ethernet system A 500 may transmit, to the RS manager of the multi-lane based Ethernet system B 510, dynamic_lane_message_start indicating that an application of the changed number of lanes stats, and then may start transmission according to the changed number of lanes.

In operation 523, the RS manager of the multi-lane based Ethernet system B 510 may transmit the received lane change information to the PCS manager of the reception side.

In the present embodiment, a point in time when the adjusted lane change information is transmitted to the PCS is set to be a point in time after dynamic_lane_message_ack is received. However, it is only an example and thus, the point in time when the adjusted lane change information is transmitted to the PCS may be set to be any point in time during a period where a control message for a lane adjustment is transmitted and is received, by considering a network state and characteristic.

FIG. 6 is a diagram illustrating a frame format for transferring lane change information according to an embodiment of the present invention.

For a dynamic lane operation in a multi-lane based Ethernet system, the frame format of FIG. 6 may be used for transmission between Ethernet systems. Also, each of messages, for example, dynamic_lane_message, dynamic_lane_message_ack, and dynamic_lane_message_start, that are transmitted and received between Ethernet systems of FIG. 5 may use the frame format of FIG. 6.

In a high speed Ethernet standardization, when a field of Lane 0 of a sequence ordered-set frame has a value of "sequence", a field of Lane 3 of the sequence ordered-set frame has a value of "0x1" or "0x02", and fields of all the remaining lanes have a value of "0x00", the sequence ordered-set frame may be used as an error-related message.

The present embodiment may use the sequence ordered-set frame format as a transfer frame format for transferring lane change information, by expanding and thereby defining the sequence ordered-set frame format.

The sequence ordered-set frame format may include a total of 66 bits, and include eight lane fields. Each of the eight lane fields may include eight bits.

As indicated by a dotted box 610, fields from Lane 0 to Lane 3 of the sequence ordered-set frame format may be used for transmission of the lane change information. Remaining Lane 4 through Lane 7 may be set to have a value of "0x00".

In the defined sequence ordered-set frame format, the field of Lane 0 may be used to indicate sequence and the fields of Lane 1 through Lane 3 may be used to indicate lane change information.

The lane change information may include a number of lanes and a variety of information associated with lanes.

Figure 7:
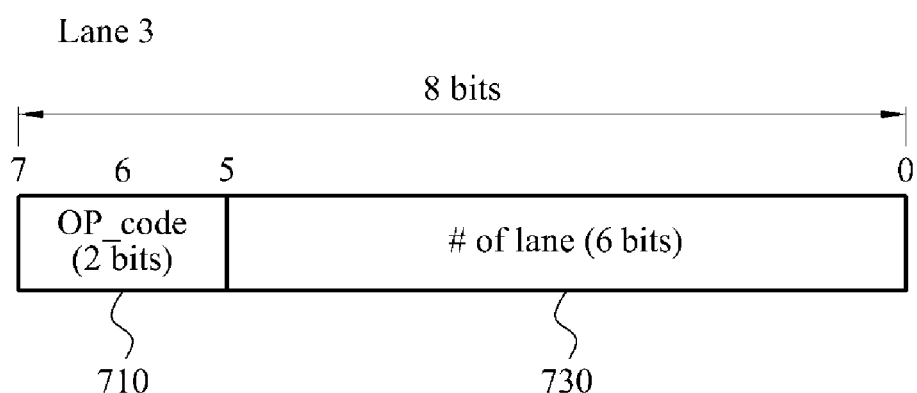
FIG. 7 is a diagram illustrating a frame format using Lane 3 according to an embodiment of the present invention.

FIG. 7 is a diagram illustrating a frame format using Lane 3 according to an embodiment of the present invention.

A field 710 for two bits for containing an operation code (OP_code) may be used to identify a type of a frame according to 00, 01, 10, and 11.

When a value of the field 710 for containing OP_code corresponds to '01', '10', and '11', respective corresponding frames may indicate messages such as dynamic_lane_message, dynamic_lane_message_ack, and dynamic_lane_message_start of FIG. 5.

Also, six bits of an information field 730 may be used to indicate lane change information containing a changed number of lanes.

According to an embodiment of the present invention, a number of bits with respect to each of the field 710 of at least two bits for containing OP_code and the information field 730 may be changed based on the lane change information, or a type of a frame.

Figure 8:
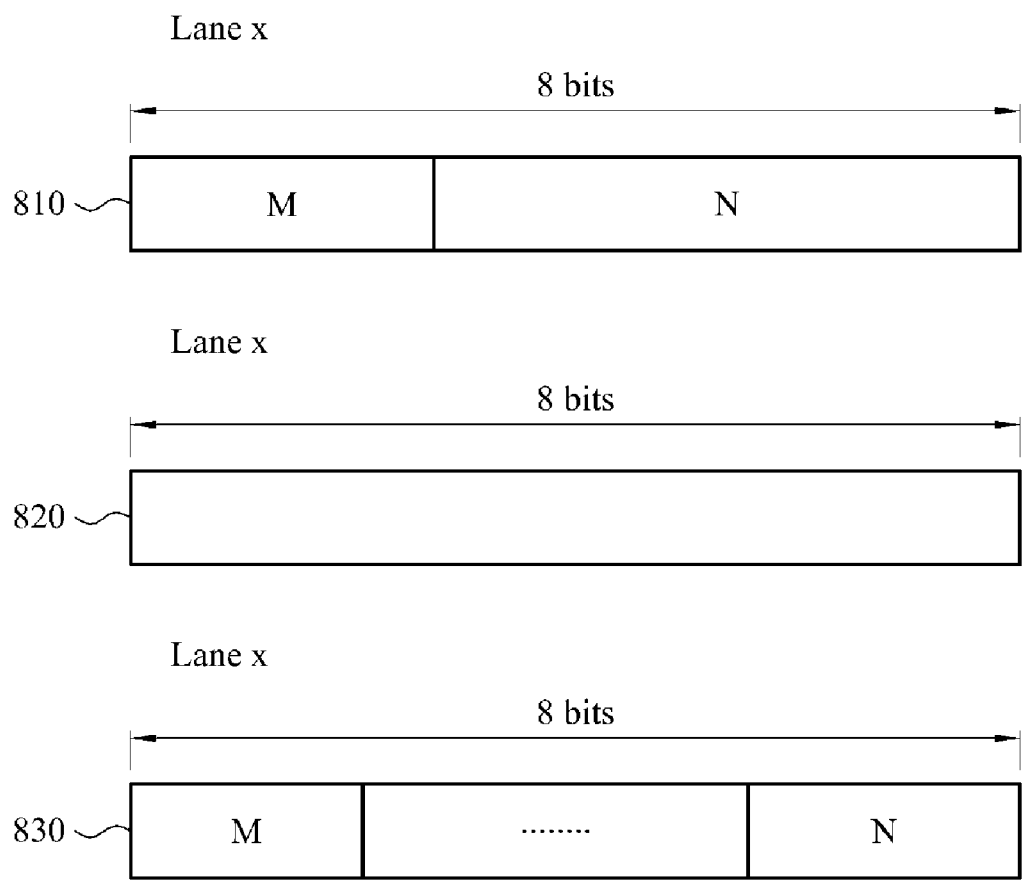
FIG. 8 is a diagram illustrating a frame format of an expanded concept using a single lane according to an embodiment of the present invention.

A frame format of an expanded type shown in FIG. 8 may be used as an expanded concept.

FIG. 8 is a diagram illustrating a frame format of an expanded concept using a single lane according to an embodiment of the present invention.

Referring to FIG. 8, the expanded frame format does not particularly constraint a lane number. Specifically, the expanded frame format may include Lane 0 through Lane 7.

The expanded frame format may be provided in a format 810 where M bits among eight bits are allocated to a field for containing OP_code and N bits are allocated to an information field, or in a format 820 where a single field is provided without separating the field for containing OP_code and the information field.

Also, the expanded frame format may be provided in a format 830 where M bits among eight bits are allocated to the field for containing OP_code, N bits are allocated to the information field, and remaining bits are allocated to include other information.

Also, lane change information may be transferred by employing a single field of Lane among fields of Lane 0 through Lane 3 of FIG. 6, or at least two lanes combining the frame formats 810, 820, and 830.

Here, to use only the fields of Lane 0 through Lane 3 is to consider a PCS code format of 40 Gb/s and 100 Gb/s Ethernet systems.

Figure 9:
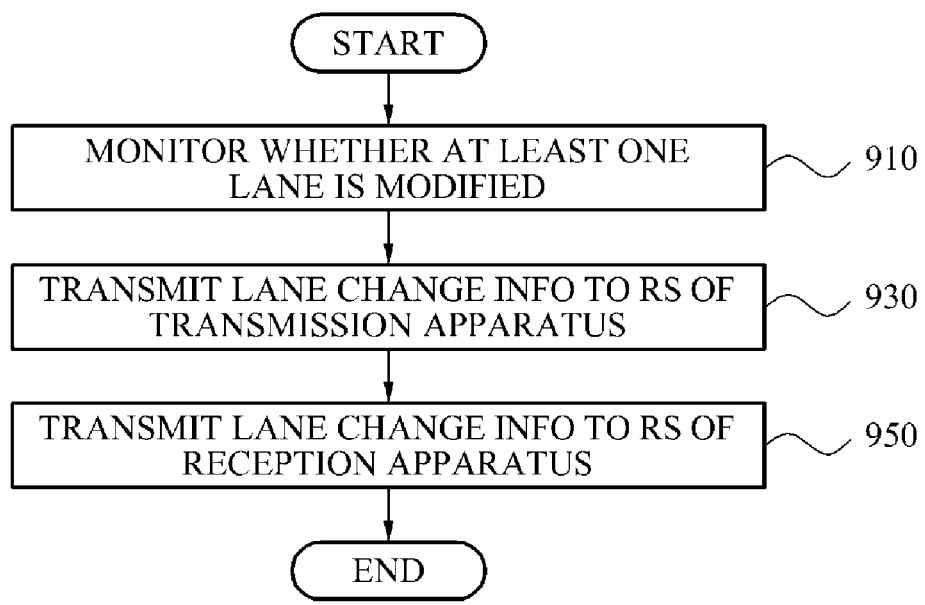
FIG. 9 is a flowchart illustrating a method of controlling a transmission apparatus for a dynamic lane operation in a multi-lane based Ethernet system according to an embodiment of the present invention.

FIG. 9 is a flowchart illustrating a method of controlling a transmission apparatus for a dynamic lane operation in a multi-lane based Ethernet system according to an embodiment of the present invention.

Referring to FIG. 9, in the method of controlling the transmission apparatus for the dynamic lane operation in the multi-lane based Ethernet system, whether at least one lane being used by the transmission apparatus is modified may be monitored in operation 910.

When information associated with the at least one lane is modified, lane change information associated with the modified at least one lane may be transmitted to an RS, more particularly, an RS manager of the transmission apparatus in operation 930.

In operation 950, the RS manager of the transmission apparatus may transmit the lane change information to an RS of a reception apparatus corresponding to the RS of the transmission apparatus. Accordingly, an effective lane operation is enabled according to a dynamically varying lane environment.

Hereinafter, the lane change information may include a number of modified at least one lane, and be transmitted using a sequence ordered-set frame format.

Figure 10:
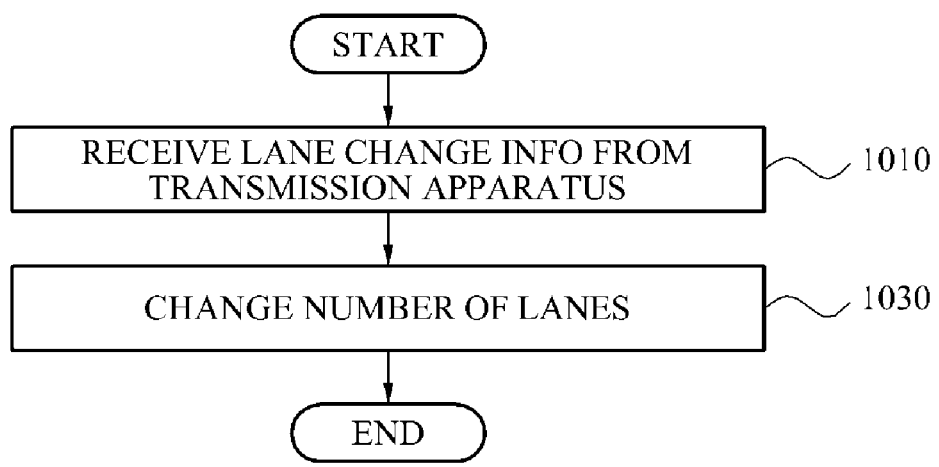
FIG. 10 is a flowchart illustrating a method of controlling a reception apparatus for a dynamic lane operation in a multi-lane based Ethernet system according to an embodiment of the present invention.

FIG. 10 is a flowchart illustrating a method of controlling a reception apparatus for a dynamic lane operation in a multi-lane based Ethernet system according to an embodiment of the present invention.

Referring to FIG. 10, the reception apparatus for the dynamic lane operation in the multi-lane based Ethernet system may receive, from a transmission apparatus, lane change information that is associated with a modification in at least one lane being used by the transmission apparatus in operation 1010, and may change a number of at least one lane being used by the reception apparatus based on the lane change information in operation 1030.

Operation 1030 may be configured to receive a number of alignment markers and a number of synchronization bits corresponding to the changed number of at least one lane with respect to each of the at least one lane being used by the reception apparatus, and to subsequently allocate the at least one lane being used by the reception apparatus based on the changed number of at least one lane.

Also, when allocating the at least one lane, the at least one lane may be allocated depending on whether the number of synchronization bits and the number of alignment markers received with respect to the at least one lane being used by the reception apparatus match a number of lanes being currently used, or according to a bit interleaved parity (BIP) value of each of the received alignment markers.

In this instance, the BIP value may be determined as a unique value with respect to each of the at least one lane.

The method of controlling the transmission apparatus and the reception apparatus described above with reference to FIG. 9 and FIG. 10 according to an embodiment of the present invention may include operations performed by the transmission apparatus and the reception apparatus for the dynamic lane operation in the multi-lane based Ethernet system described above with reference to FIG. 1 through FIG. 8.

Accordingly, descriptions made above with respect to the transmission apparatus and to the reception apparatus with respect to FIG. 1 through FIG. 8 may be applicable to the method of controlling the transmission apparatus and the reception apparatus for the dynamic lane operation in the multi-lane based Ethernet system.

The above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A transmission apparatus for a dynamic lane operation in a multi-lane based Ethernet system, comprising:
a monitor to monitor whether at least one lane being used by the transmission apparatus is modified;
an upper layer manager to transmit, to a Reconciliation Sublayer (RS) of the transmission apparatus, lane change information associated with the modified at least one lane;
an RS manager to transmit the lane change information to an RS of a reception apparatus corresponding to the RS of the transmission apparatus;
and a Physical Coding Sublayer (PCS) manager to change a number of at least one lane being used by the reception apparatus based on the lane change information;
wherein the PCS manager receives a number of alignment markers and a number of synchronization bits corresponding to the changed number of at least one lane with respect to each of the at least one lane being used by the reception apparatus, and subsequently allocates the at least one lane being used by the reception apparatus based on the changed number of at least one lane;
the PCS manager comprising
a lane block synchronization module to receive, from a lower layer, a synchronization signal and a control signal for each of the at least one lane being used by the reception apparatus, and
an alignment lock lane disqueue module to adjust, using the control signal, an alignment state and a torsion of each of the at least one lane being used by the reception apparatus,
wherein the lane block synchronization module or the alignment lock lane disqueue module operates depending on whether a number of synchronization bits and a number of alignment markers received with respect to the at least one lane being used by the reception apparatus match a number of lanes being currently used.

2. The transmission apparatus of claim 1, wherein:
the lane change information is transmitted using a sequence ordered-set frame format,
the sequence ordered-set frame format includes eight lane fields, and
each of the eight lane fields includes eight bits.

3. The transmission apparatus of claim 2, wherein the lane change information is transmitted using lane fields from Lane 0 to Lane 3 of the sequence ordered-set frame format.

4. The transmission apparatus of claim 2, wherein each of the eight lane fields includes a field of at least two bits for containing an operation code and an information field containing the lane change information.

5. The transmission apparatus of claim 4, wherein a number of bits with respect to each of the field of at least two bits for containing the operation code and the information field is changed based on the lane change information.

6. A reception apparatus for a dynamic lane operation in a multi-lane based Ethernet system, comprising:
an RS manager to receive, from a transmission apparatus, lane change information that is associated with a modification in at least one lane being used by the transmission apparatus; and
a Physical Coding Sublayer (PCS) manager to change a number of at least one lane being used by the reception apparatus based on the lane change information;
wherein the PCS manager receives a number of alignment markers and a number of synchronization bits corresponding to the changed number of at least one lane with respect to each of the at least one lane being used by the reception apparatus, and subsequently allocates the at least one lane being used by the reception apparatus based on the changed number of at least one lane;
and wherein the PCS manager comprises
a lane block synchronization module to receive, from a lower layer, a synchronization signal and a control signal for each of the at least one lane being used by the reception apparatus;
and an alignment lock lane disqueue module to adjust, using the control signal, an alignment state and a torsion of each of the at least one lane being used by the reception apparatus,
and the lane block synchronization module or the alignment lock lane disqueue module operates depending on whether a number of synchronization bits and a number of alignment markers received with respect to the at least one lane being used by the reception apparatus match a number of lanes being currently used.

7. The reception apparatus of claim 6, wherein the lane change information includes the changed number of at least one lane.

8. The reception apparatus of claim 6, wherein:
the lane change information is transmitted using a sequence ordered-set frame format, the sequence ordered-set frame format includes eight lane fields, and each of the eight lane fields includes eight bits.

9. The reception apparatus of claim 8, wherein the lane change information is transmitted using lane fields from Lane 0 to Lane 3 of the sequence ordered-set frame format.

10. The reception apparatus of claim 8, wherein each of the eight lane fields includes a field of at least two bits for containing an operation code and an information field containing the lane change information.

11. The reception apparatus of claim 10, wherein a number of bits with respect to each of the field of at least two bits for containing the operation code and the information field is changed based on the lane change information.

12. A method of controlling a transmission apparatus for a dynamic lane operation in a multi-lane based Ethernet system, the method comprising:
monitoring whether at least one lane being used by the transmission apparatus is modified;
transmitting, to an RS of the transmission apparatus, lane change information associated with the modified at least one lane;
transmitting the lane change information to an RS of a reception apparatus corresponding to the RS of the transmission apparatus;
and changing, by a Physical Coding Sublayer (PCS) manager, a number of at least one lane being used by the reception apparatus based on the lane change information;
wherein the PCS manager receives a number of alignment markers and a number of synchronization bits corresponding to the changed number of at least one lane with respect to each of the at least one lane being used by the reception apparatus, and subsequently allocates the at least one lane being used by the reception apparatus based on the changed number of at least one lane;

the PCS manager comprising a lane block synchronization module to receive, from a lower layer, a synchronization signal and a control signal for each of the at least one lane being used by the reception apparatus, and an alignment lock lane disqueue module to adjust, using the control signal, an alignment state and a torsion of each of the at least one lane being used by the reception apparatus, wherein the lane block synchronization module or the alignment lock lane disqueue module operates depending on whether a number of synchronization bits and a number of alignment markers received with respect to the at least one lane being used by the reception apparatus match a number of lanes being currently used.

13. A method of controlling a reception apparatus for a dynamic lane operation in a multi-lane based Ethernet system, the method comprising:

receiving, from a transmission apparatus, lane change information that is associated with a modification in-at least one lane being used by the transmission apparatus;

and changing, by a Physical Coding Sublayer (PCS) manager, a number of at least one lane being used by the reception apparatus based on the lane change information;

wherein the PCS manager receives a number of alignment markers and a number of synchronization bits corresponding to the changed number of at least one lane with respect to each of the at least one lane being used by the reception apparatus, and subsequently allocates the at least one lane being used by the reception apparatus based on the changed number of at least one lane;

the PCS manager comprising a lane block synchronization module to receive, from a lower layer, a synchronization signal and a control signal for each of the at least one lane being used by the reception apparatus, and an alignment lock lane disqueue module to adjust, using the control signal, an alignment state and a torsion of each of the at least one lane being used by the reception apparatus, wherein the lane block synchronization module or the alignment lock lane disqueue module operates depending on whether a number of synchronization bits and a number of alignment markers received with respect to the at least one lane being used by the reception apparatus match a number of lanes being currently used.

* * * * *